United States Patent
Aoki et al.

(10) Patent No.: US 7,042,718 B2
(45) Date of Patent: May 9, 2006

(54) INFORMATION DISPLAY APPARATUS

(75) Inventors: Yoshihiko Aoki, Kanagawa (JP); Hirohisa Shibuya, Tokyo (JP); Kazushi Sakuma, Chiba (JP); Masataka Nishomiya, Tokyo (JP)

(73) Assignee: Sony Corporation, (JP)

(*) Notice: Subject to any disclaimer, the term of this patent is extended or adjusted under 35 U.S.C. 154(b) by 8 days.

(21) Appl. No.: 10/356,506

(22) Filed: Feb. 3, 2003

(65) Prior Publication Data
US 2003/0161099 A1   Aug. 28, 2003

(30) Foreign Application Priority Data
Feb. 4, 2002   (JP)   ............ P2002-027200

(51) Int. Cl.
*G06F 1/16* (2006.01)
(52) U.S. Cl. ............ 361/686; 710/303; 710/304
(58) Field of Classification Search ........ 361/680–683, 361/686, 684; 70/58, 59; 455/411, 26.1, 455/575.1, 899, 556.1, 556.2; 345/173, 174, 345/169; 349/58; 248/551, 553; 710/303, 710/304; 709/208–216, 227–246; 382/181–231; 713/200–202
See application file for complete search history.

(56) References Cited

U.S. PATENT DOCUMENTS

| | | | | |
|---|---|---|---|---|
| 5,606,594 A | * | 2/1997 | Register et al. | 455/556.2 |
| 5,619,397 A | * | 4/1997 | Honda et al. | 361/686 |
| 6,002,921 A | * | 12/1999 | Pfahlert et al. | 455/575.9 |
| 6,047,572 A | * | 4/2000 | Bliven et al. | 70/58 |
| 6,102,284 A | * | 8/2000 | Myers et al. | 235/375 |
| 6,151,218 A | * | 11/2000 | Pirdy et al. | 361/727 |
| 6,231,371 B1 | * | 5/2001 | Helot | 439/374 |
| 6,450,727 B1 | * | 9/2002 | Lu | 403/322.1 |
| 6,581,420 B1 | * | 6/2003 | Ling et al. | 70/58 |
| 6,606,662 B1 | * | 8/2003 | Nagasaki | 709/229 |
| 6,661,399 B1 | * | 12/2003 | Oh et al. | 345/87 |
| 6,798,647 B1 | * | 9/2004 | Dickie | 361/683 |
| 2002/0119800 A1 | * | 8/2002 | Jaggers et al. | 455/550 |

* cited by examiner

*Primary Examiner*—Lynn Feild
*Assistant Examiner*—Anthony Q. Edwards
(74) *Attorney, Agent, or Firm*—Rader, Fishman & Grauer PLLC; Ronald B. Kananen

(57) ABSTRACT

A portable information terminal apparatus includes a portable information terminal unit having a display surface capable of displaying the information and a cradle on which the portable information terminal unit can be detachably mounted. When the portable information terminal unit is loaded on the cradle, data can be transmitted/received to or from another electronic equipment through the cradle. The portable information terminal apparatus includes a lock mechanism for switching the portable information terminal unit between a locked state and an unlocked state when the portable information terminal unit is loaded on the cradle. The portable information terminal unit includes an information readout unit for reading out the contact information and a controlling unit for controlling the lock mechanism when the information readout unit has read out the preset contact information.

12 Claims, 10 Drawing Sheets

INFORMATION DISPLAY APPARATUS

BACKGROUND OF THE INVENTION

1. Field of the Invention

The present invention relates to an information display apparatus for forming a liquid crystal display surface by a liquid crystal display device. More particularly, it relates to a portable information terminal apparatus that may be applied with advantage to a portable information terminal unit and a lock control system for locking the mounting of the portable information terminal unit to a cradle. This application claims priority of Japanese Patent Application No. 2002-027200, filed on Feb. 4, 2002, the entirety of which is incorporated by reference herein.

2. Description of Related Art

Recently, an information terminal unit convenient for transportation, such as a so-called mobile computer or PDA (Personal Digital Assistant), referred to below as a portable information terminal unit, is being developed extensively.

These portable information terminal units use a liquid crystal display from the perspective of achieving light weight and thin thickness, as shown in FIG. 1. A portable information terminal unit 8 demonstrates the necessary information for the user through a display. This display uses a liquid crystal display device as an optical modulation element and displays the text or a picture by reflecting the external incident light.

The user executes necessary inputting operations through the liquid crystal display responsive to the text or the picture demonstrated on the liquid crystal display. Thus, the liquid crystal display is designed as a pressure-sensitive display panel which enables desired input on pressure application with a finger tip or with a pen-type actuating rod.

FIG. 2 shows the back surface of a conventional portable information terminal unit 8, and a cradle 9 on which is mounted the portable information terminal unit 8.

On the back surface of the portable information terminal unit 8 is mounted a cradle connection terminal 81. This cradle connection terminal 81 is an interface for inputting/outputting data to or from the cradle 9.

This cradle 9 is a stand type docking station having a center recess in which to mount the portable information terminal unit 8. The cradle 9 includes a terminal unit connection terminal 91 for mounting the cradle connection terminal 81 and a USB cable 92 for connecting electronic equipment, such as a personal computer, or a power supply unit. That is, the portable information terminal unit 8 is able to co-own data with the electronic equipment on mounting the portable information terminal unit on the cradle 9. The portable information terminal unit 8 also is supplied with power over a USB cable 92 from, e.g., a charging power supply of an electronic equipment or a battery on setting the portable information terminal unit 8 on the cradle 9.

By mounting the portable information terminal unit 8 on the cradle 9 as shown in FIG. 3, the user is able to view the liquid crystal display on a table or in a motor vehicle without manually holding the portable information terminal unit 8.

Meanwhile, since the portable information terminal unit 8 is lightweight and small-sized for enhancing the portability, it tends to be disengaged from the cradle 9 on which it is set, even under the slightest oscillations. Moreover, the portable information terminal unit 8 can be taken out readily, so that it is prone to be stolen, and hence may be insufficient in security.

Heretofore, in order to secure the portable information terminal unit 8 on the cradle 9 or to prevent burglary, a lock mechanism was provided for locking the mounting between the portable information terminal unit 8 and the cradle 9. With this lock mechanism, a key is inserted into a burglary-proofing device mounted to the portable information terminal unit 8 and/or to the cradle 9 or a password set from user to user is entered to achieve the lock.

However, if the burglary-proofing device, for example, is to be provided in the above-described lock mechanism, the user has to carry the key at all times. Moreover, once locked, the user has to insert the key into the burglary-proofing device each time he/she is to carry the portable information terminal unit in order to unlock the terminal unit, thus increasing the load on the part of the user.

Additionally, since Internet services and software products nowadays require various different passwords, it is cumbersome for the user to set and learn by heart a password composed of a number of digits in order to prevent burglary of the portable information terminal unit 8.

SUMMARY OF THE INVENTION

In view of the above-depicted status of the art, it is an object of the present invention to provide a portable information terminal apparatus and a lock control system whereby the portable information terminal unit can be locked readily to the cradle to relieve the load on the part of the user.

For accomplishing the above object, the present inventor has devised a portable information terminal apparatus, a lock controlling system and a lock method in which the loading of a portable information terminal unit on the cradle may be locked when the portable information terminal unit is mounted on the cradle.

The present invention provides a portable information terminal apparatus in which the information is displayed on a liquid crystal display surface formed by a liquid crystal display device and in which data are transmitted/received with other electronic equipment through the cradle on which the portable information terminal unit is mounted. The portable information terminal apparatus includes a loading lock mechanism for locking the loading of the portable information terminal unit on the cradle, controlling means operating based on a control program for controlling the loading lock mechanism, and detection means for transmitting the loading detection signal to the controlling means when the portable information terminal unit is loaded on the cradle. The controlling means is responsive to the loading detection signal to control the loading lock mechanism to lock the loading of the portable information terminal unit on the cradle.

The present invention also provides a lock controlling system including a cradle connected to an electronic equipment, a portable information terminal unit for transmitting/receiving data with other electronic equipment through a cradle on which the portable information terminal unit is loaded, and a loading lock mechanism for locking the loading of the portable information terminal unit on the cradle. When the portable information terminal unit is loaded on the cradle, the loading lock mechanism is controlled for locking the loading of the portable information terminal unit on the cradle.

According to the present invention, the loading of a portable information terminal unit on a cradle may be locked when the portable information terminal unit is loaded on the cradle. On the other hand, the loading of the portable information terminal unit on the cradle may be locked responsive to a user's input through a pressure-sensitive panel. Thus, according to the present invention, it is possible to prevent the portable information terminal unit from being disengaged from the cradle under trifling vibrations, and security may be protected smoothly, while the user's load is relieved.

DESCRIPTION OF THE PREFERRED EMBODIMENTS

Figure 1:
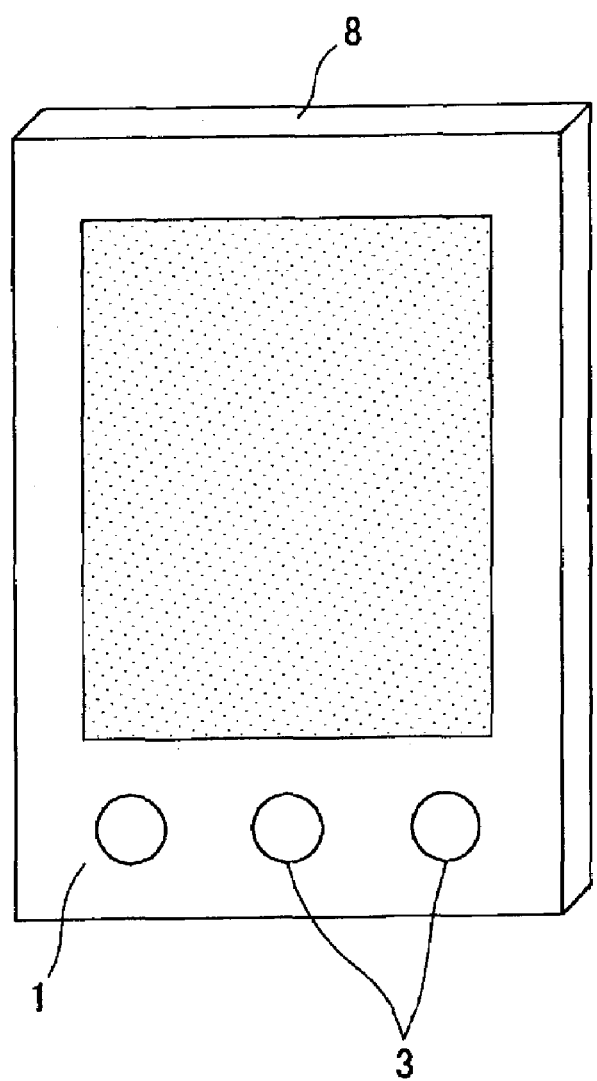
FIG. 1 illustrates the appearance of a conventional, portable information terminal unit.
Figure 2:
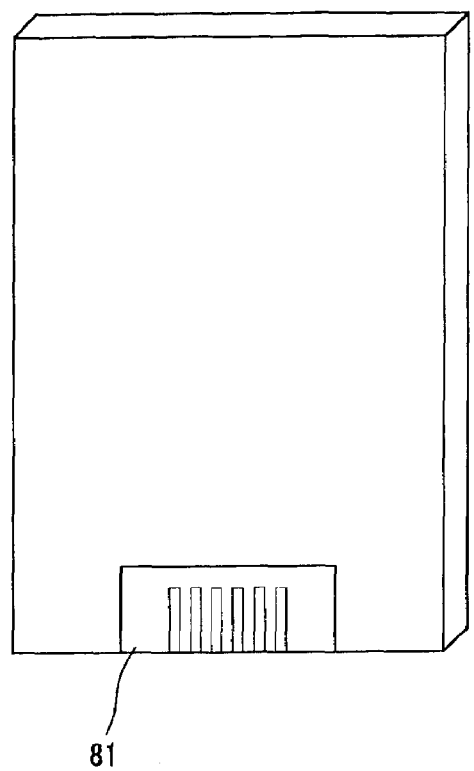
FIG. 2 illustrates the back surface of the conventional, portable information terminal unit, and a cradle on which to set the unit.
Figure 2:
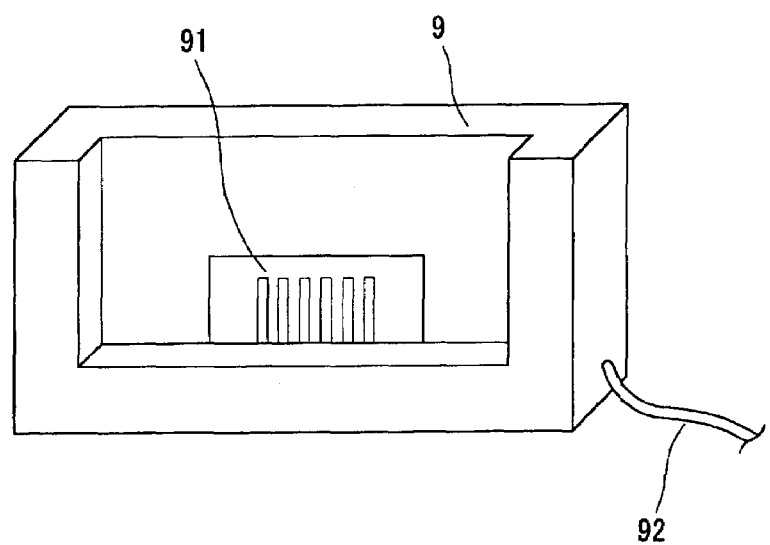
Figure 3:
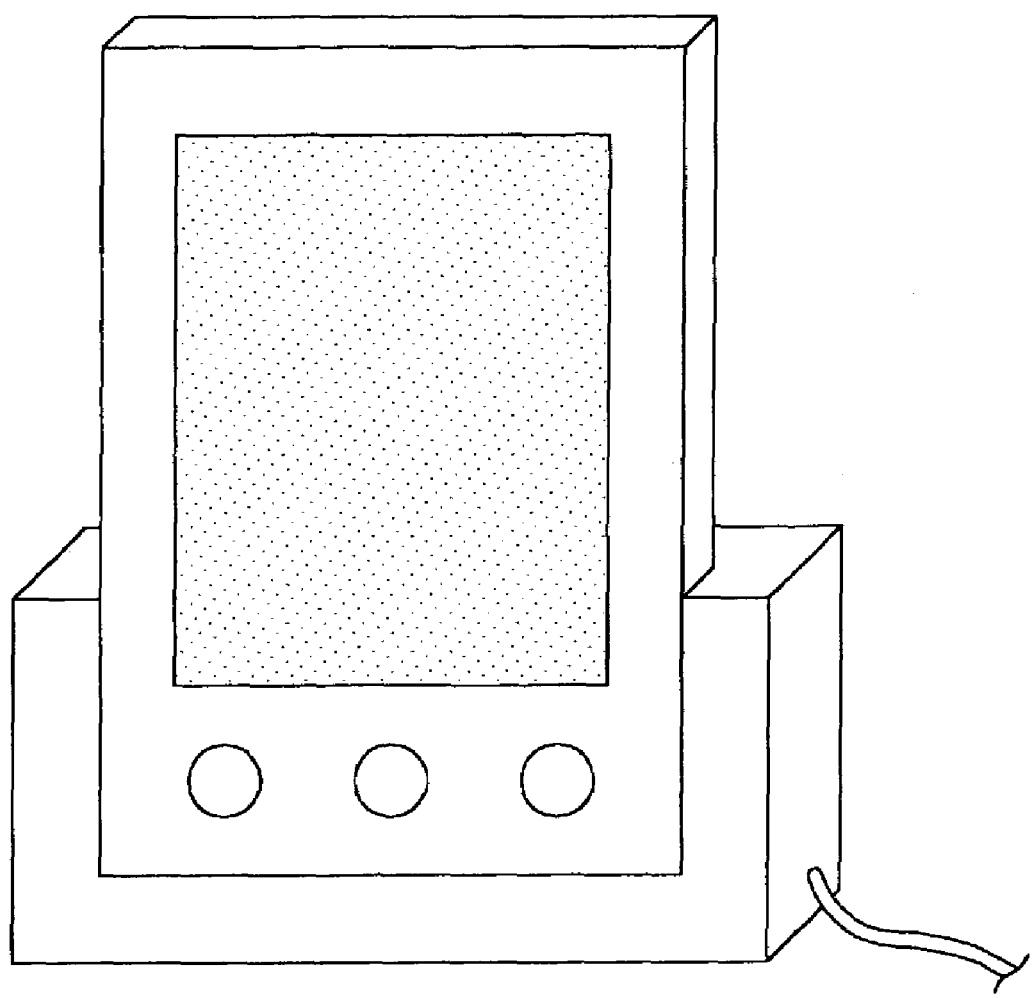
FIG. 3 illustrates the conventional, portable information terminal unit loaded on a cradle.

Referring to the drawings, a preferred embodiment of the present invention will be explained in detail.

Figure 4:
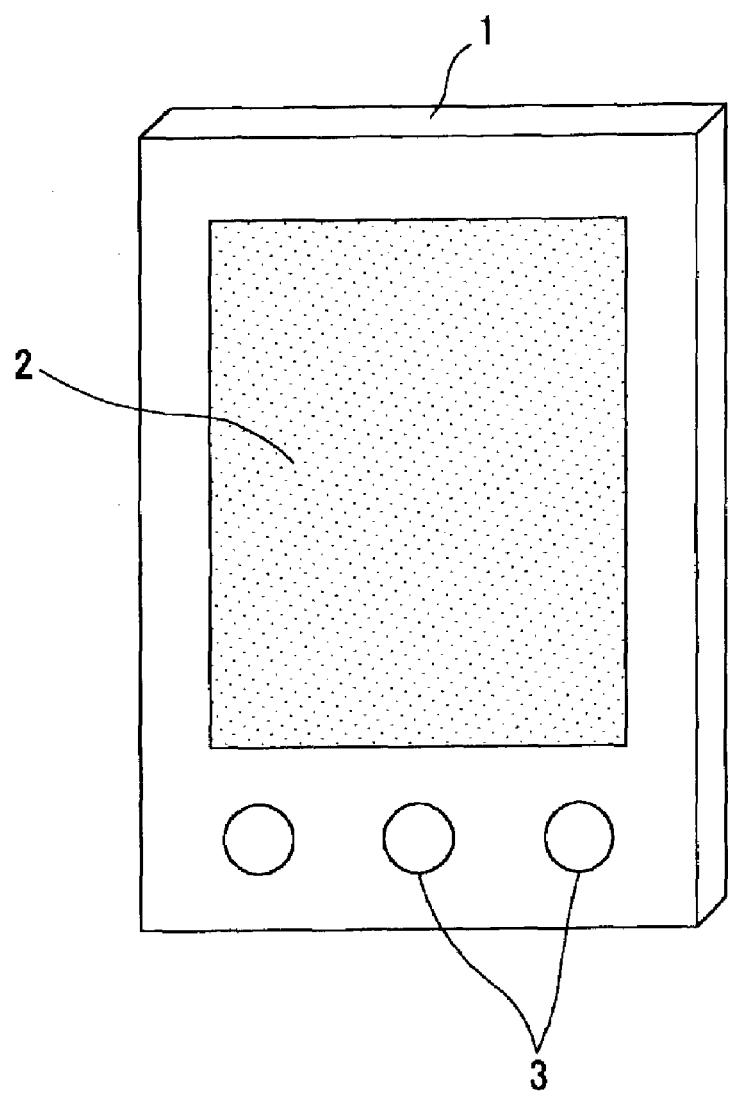
FIG. 4 illustrates an outer structure of a portable information terminal unit embodying the present invention.

The present invention is applied to a portable information terminal unit 1 shown, for example, in FIG. 4. The portable information terminal unit 1 is an information terminal unit that may be conveniently carried along by a user, such as a mobile computer or a PDA (Personal Digital Assistant). The terminal unit makes use of a liquid crystal display 2 from the perspective of achieving light weight and thin thickness.

The portable information terminal unit 1 displays the necessary information to the user by, for example, a liquid crystal display 2. The user performs necessary input operations responsive to the information displayed on the display 2. The display 2 is a pressure-sensitive type display panel for achieving a desired input on pressing with a finger tip or with an actuating bar. The user is able to perform various setting operations through a user input button 3 from outside the portable information terminal unit 1, in addition to the aforementioned pressure-sensitive type display panel.

Figure 5:
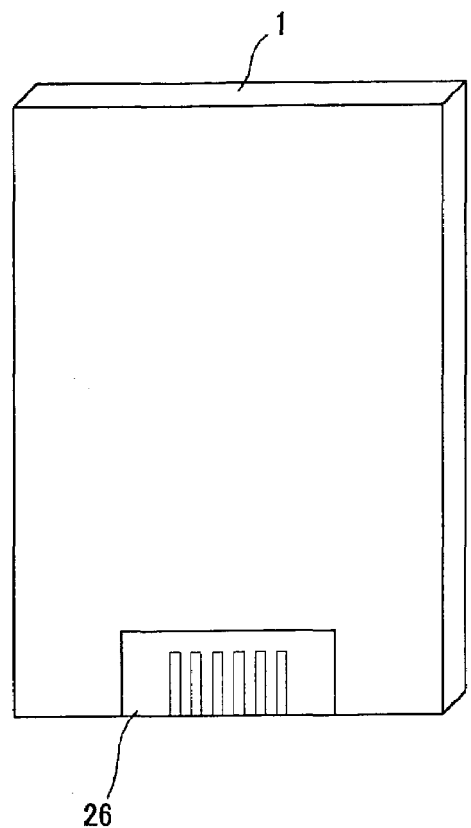
FIG. 5 shows the back surface of the portable information terminal unit embodying the present invention and a cradle on which to set the portable information terminal unit.
Figure 5:
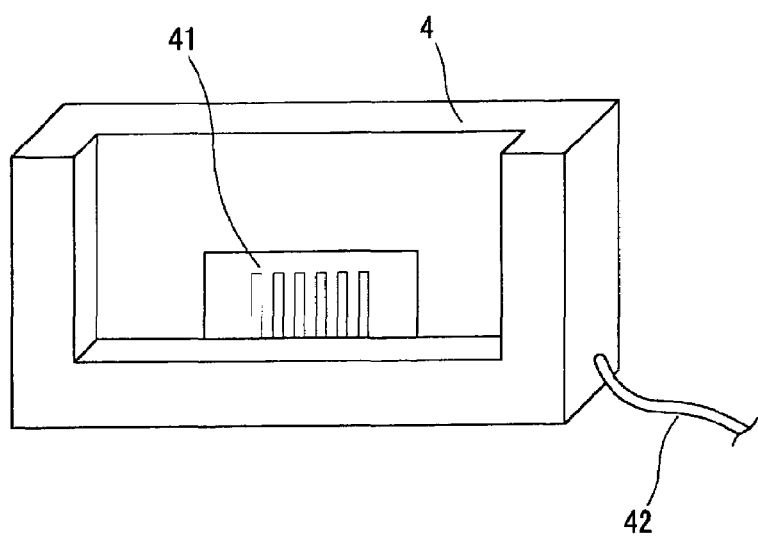

FIG. 5 shows the back side of the portable information terminal unit 1 embodying the present invention and a cradle 4 on which is loaded the portable information terminal unit 1.

On the back side of the portable information terminal unit 1 is mounted a cradle connection unit 26. This cradle connection unit 26 is an interface for inputting/outputting data to or from the cradle 4. Meanwhile, the cradle 4 is secured in a preset stationary location.

The cradle 4 is a stand-type docking station having a center recess in which to mount the portable information terminal unit 1. The cradle 4 includes a terminal unit connection terminal 41 for mounting the cradle connection unit 26 and a USB cable 42 for connecting an electronic equipment, such as a personal computer or a power supply. That is, when mounted to the cradle 4, the portable information terminal unit 1 is able to co-own data with the electronic equipment. Additionally, when mounted on the cradle 4, the portable information terminal unit 1 is supplied with power over USB cable 42 from, e.g., a charging power supply of an electronic equipment or battery.

Figure 6:
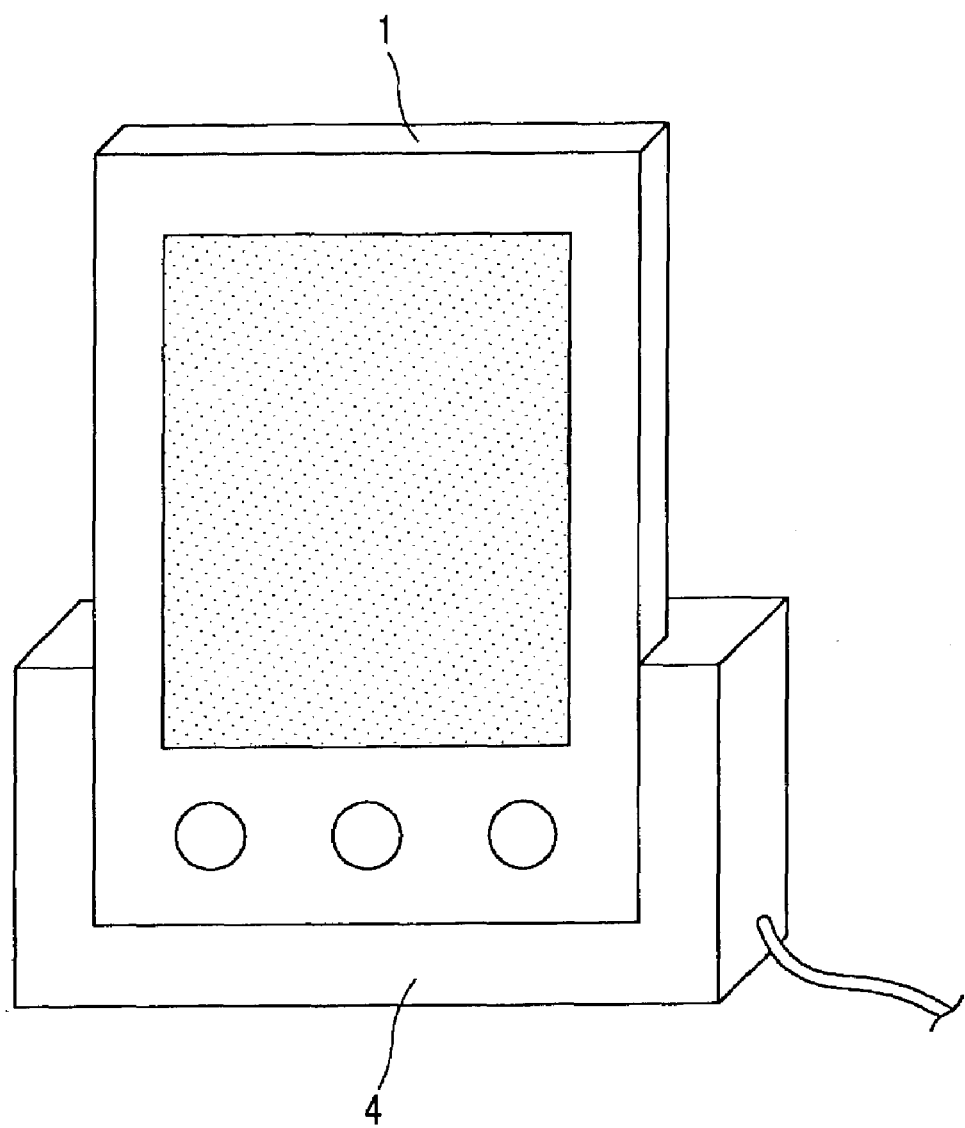
FIG. 6 shows the portable information terminal unit loaded on the cradle.

When the portable information terminal unit 1 is mounted on the cradle 4 as shown in FIG. 6, the user is able to view the liquid crystal display on a table or in a motor-vehicle without having to hand-hold the portable information terminal unit 1.

Figure 7:
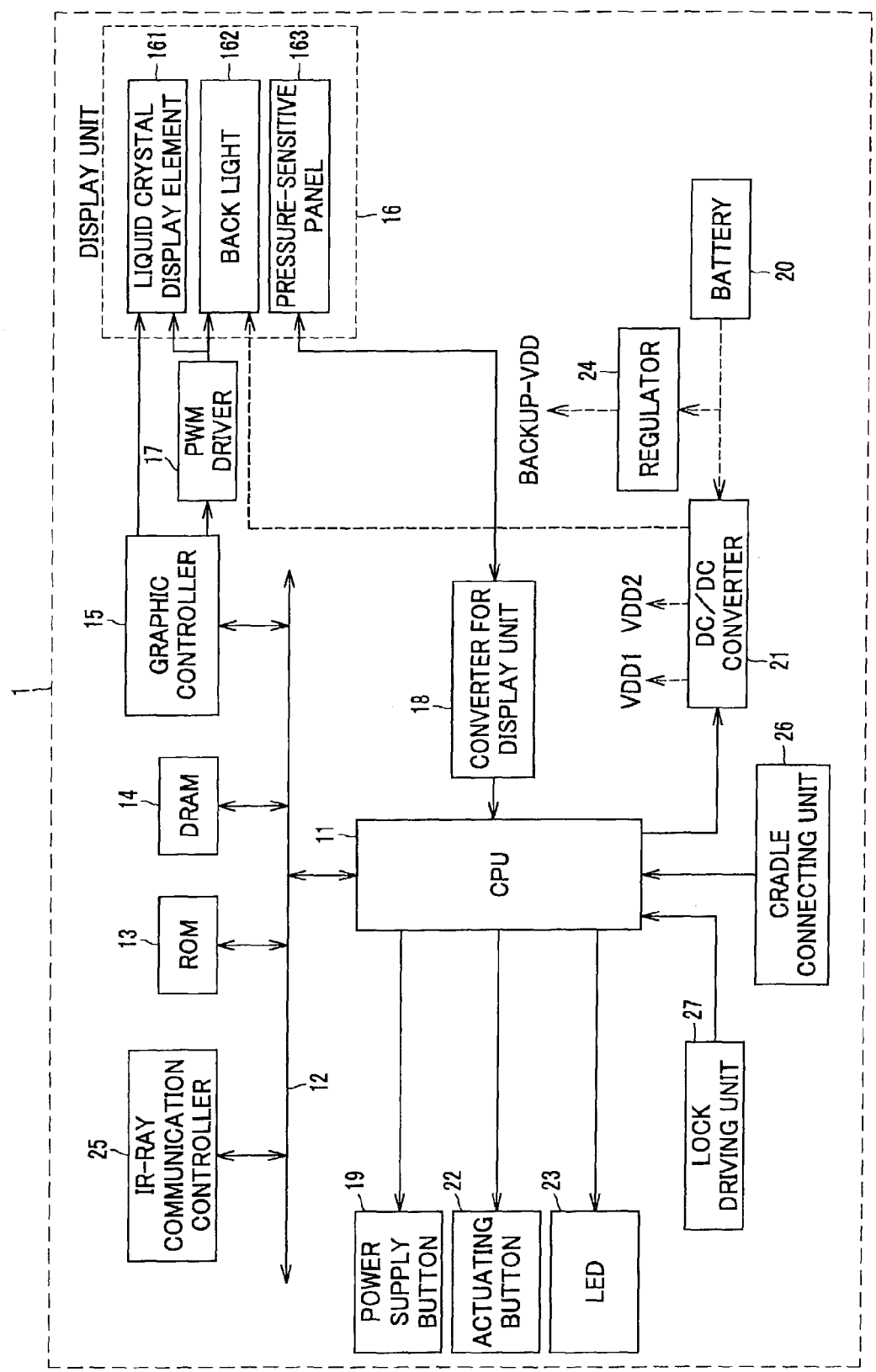
FIG. 7 illustrates a typical inner structure of the portable information terminal unit according to the present invention.

Referring to FIG. 7, an illustrative inner structure of the portable information terminal unit 1 embodying the present invention is explained in detail.

In FIG. 7, the portable information terminal unit 1 includes a CPU (Central Processing Unit) 11, a data bus 12, a ROM 13, a DRAM 14, a graphics controller 15, a display unit 16 having a pressure-sensitive panel, a PWM driver 17, a converter for the display unit 18, a power supply button 19, a battery 20, a DC/DC converter 21, an actuating button 22, an LED 23, a regulator 24, an IR-ray communication controller 25, a cradle connecting unit 26 and a lock driving unit 27.

The CPU 11 is a central operating unit controlling the portable information terminal unit 1 in its entirety, and it is connected over the data bus 12 to the ROM 13 for storage of a control program to be executed and to the DRAM 14 as a work area used for data storage or expansion. The CPU 11 controls the lock driving unit 27 based on the response of the contact information from the user through the display unit 16. The CPU 11 also sends the information to be disclosed to the user through, e.g., the graphics controller 15 to the display unit 16.

The ROM 13 holds not only the control program but also a database for calculating the longitude and the latitude based on map data or addresses. In addition, the DRAM 14 perpetually holds input patterns or recognition portions of passwords for lock driving or unlock and personal management data, without regard to the on/off state of the main power supply.

The graphics controller 15 executes picture processing to the display unit 16 under control by the CPU 11. This graphics controller 15 controls the contrast and luminance in the display unit 16 via PWM driver 17.

The display unit 16, made up by a liquid crystal display element 161, a back light 162 and a transparent pressure-sensitive panel 163 arranged on the liquid crystal display element 161, is an interface for a user to have a dialog with the portable information terminal unit 1.

The liquid crystal display element 161 is an optical modulation element, comprised of a reflection type liquid crystal display element or a hybrid liquid crystal display element, employing both the reflected light and the transmitted back light, and forms a liquid crystal display for demonstrating the information for the user. On the liquid crystal display, there is displayed an icon for command input, in addition to a display object, such as map information, for making a disclosure for the user. It should be noted that, if the light volume of the external incident light to the liquid crystal display element 161 is not sufficient, the reflected light volume sometimes may be decreased, thereby detracting from the viewability.

The back light 162 illuminates the light from the back side or the lateral side of the liquid crystal display device to maintain the viewability of the liquid crystal display.

The pressure-sensitive panel 163 is a resistance film type panel, the output voltage of which is changed depending on the area pressed, that is, on the contact information.

The converter for the display unit 18 is connected to the CPU 111 and to the pressure-sensitive panel 163 and detects the output voltage from the pressure-sensitive panel 163 to convert the detected output voltage into digital data that is routed to the CPU 11.

The power supply button 19 is arranged externally of the portable information terminal unit 1 and, when pressed by the user, notifies the CPU 11 of the effect that the power supply will be turned on.

The battery 20 is an enclosed unit designed to supply driving current to the overall, portable information terminal unit 1. This battery may be formed, for example, by a lithium secondary battery. The power supply from the battery 20 is controlled by the CPU 11 detecting the pressing operation to the power supply button 19.

The DC/DC converter 21 operates under control by the CPU 111 to convert the power supplied from the battery 20 into the power supply voltage required for respective devices forming the portable information terminal unit 1. This DC/DC converter 21 sends the power for illumination to the back light 162.

The actuating button 22 is pressed for input when the display content by the display unit 16 is to be changed, and it is equivalent to the user input button described above. That is, by pressing this actuating button 22 for input, a change may be made to the pre-defined display state, for example, from the state of demonstrating a schedule table to the state of displaying a map.

The LED 23 is a light emitting element for advising the user of the state of the portable information terminal unit 1, and it is turned on or off on power up or power down of the power supply, respectively.

In the power down state, the regulator 24 sends the power to the devices in need of backup, such as CPU 11 or DRAM 14.

The IR-ray communication controller 25 is a controller for transmitting/receiving data by optical communication to or from the external devices. This IR-ray communication controller 25 inputs/outputs data, transmitted to or received from external devices, over the data bus 12 connected thereto in cooperation with, e.g., the CPU 11.

When the loading on the cradle 4 is detected, the cradle connecting unit 26 sends a loading detection signal to the CPU 11. The cradle connecting unit 26 outputs data input from the cradle 4 to the CPU 11, while outputting data input from the CPU 11 to the cradle 4. The cradle connecting unit 26 also receives the power from the cradle 4.

Figure 8:
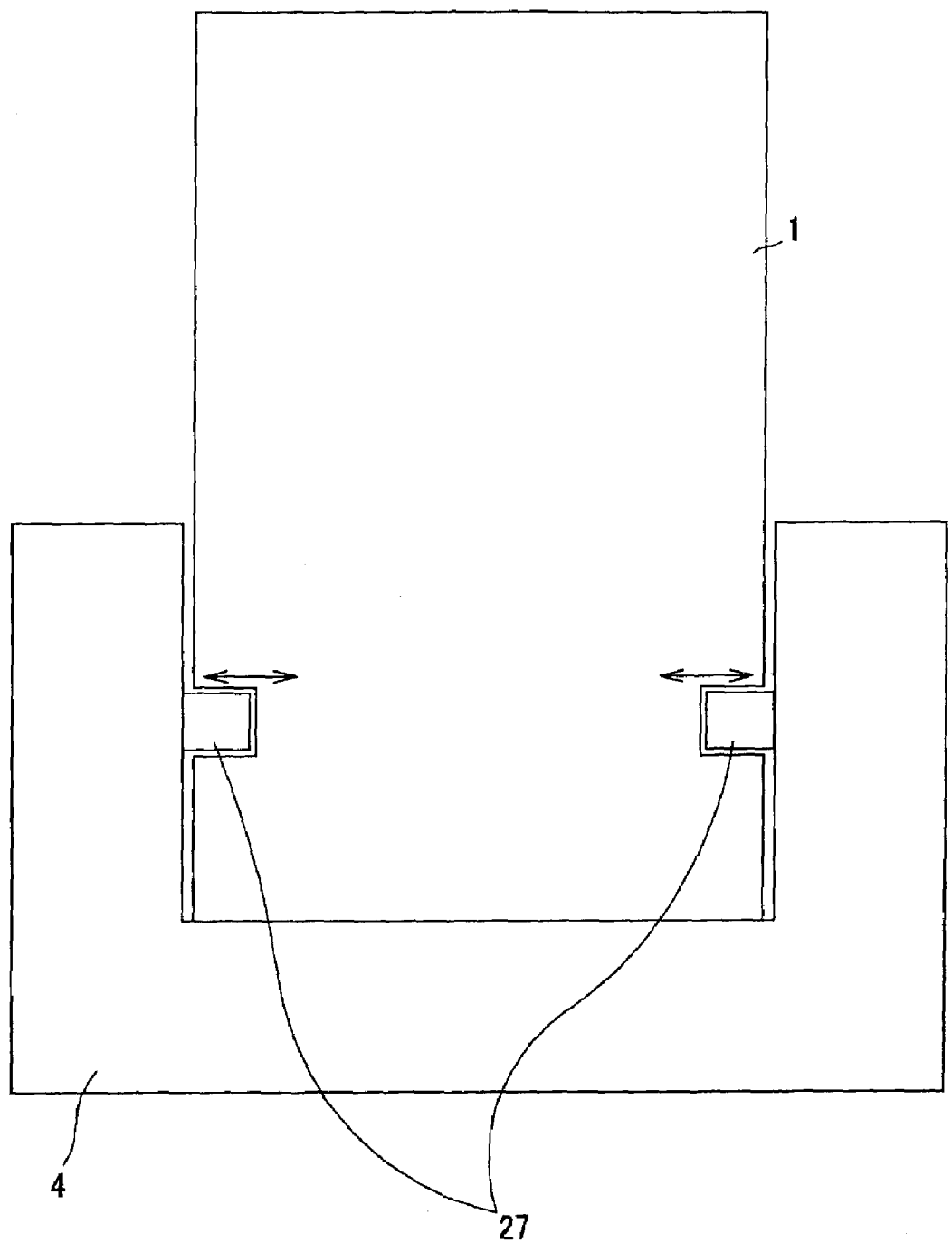
FIG. 8 illustrates the mechanism of a lock driving unit.

Under control by the CPU 11, the lock driving unit 27 locks or unlocks the loading of the portable information terminal unit 1 to or from the cradle 4, respectively. The lock driving unit 27 causes a rod provided for emerging and receding movement to the cradle 4 to be protruded at the time of lock driving into engagement in a recess provided in the portable information terminal unit 1 to establish a locked state, while causing the rod of the cradle 4 to be receded to enable the portable information terminal unit 1 to be taken out from the cradle 4 to establish the unlocked state, as shown, for example, in FIG. 8.

Figure 9:
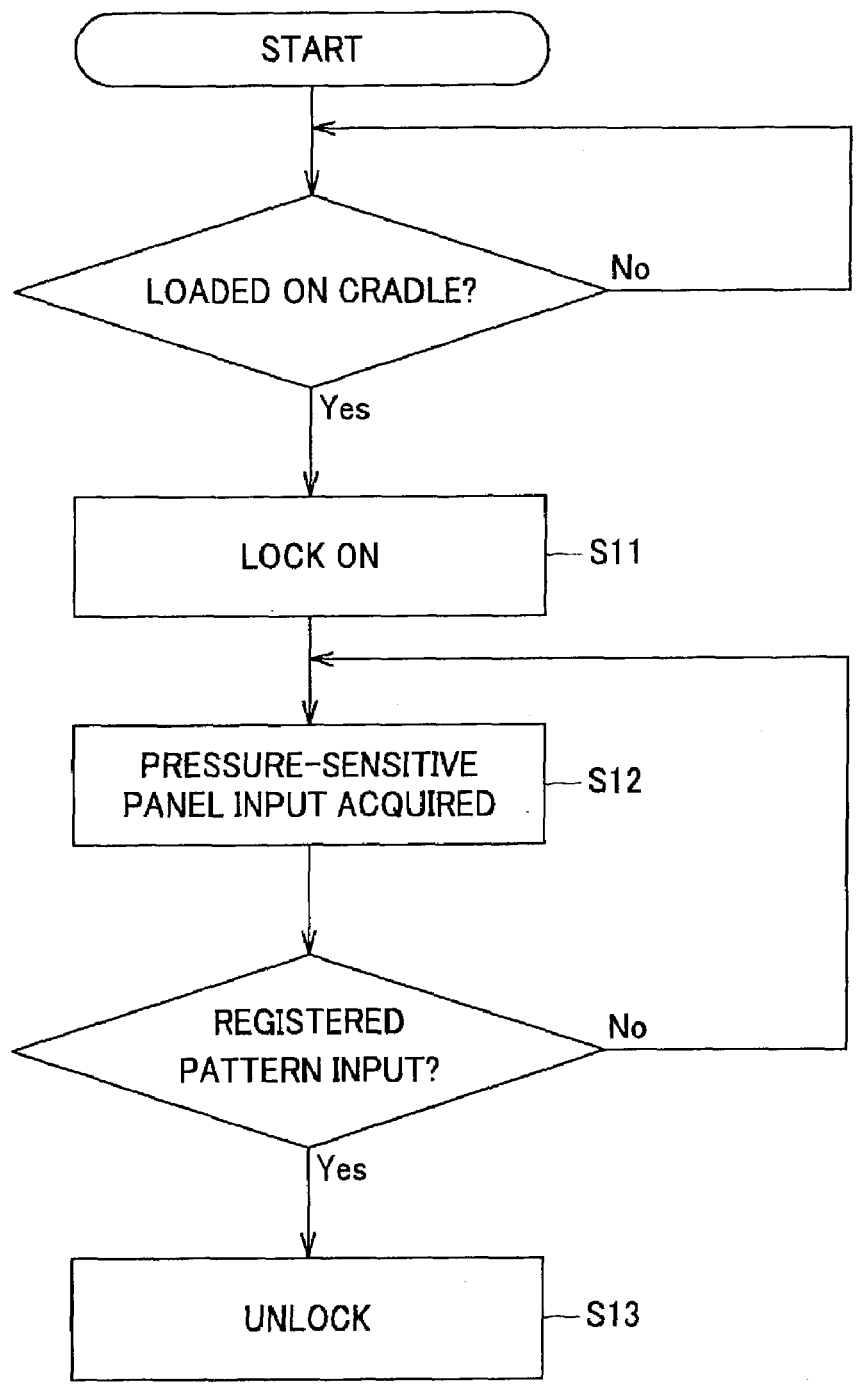
FIG. 9 is a flowchart showing a first processing sequence of a portable information terminal unit embodying the present invention.

The first processing sequence of the portable information terminal unit 1, embodying the present invention, is now explained with reference to FIG. 9.

When the user sets the portable information terminal unit 1 on the cradle 4, the cradle connecting unit 26 detects the loading to the cradle 4 and transmits a loading detection signal to the CPU 11. Responsive to this loading detection signal, the CPU 11 controls the lock driving unit 27 to lock the loading of the portable information terminal unit to the cradle 4 (step S11).

On receipt of the user's input through the pressure-sensitive panel 163, that is, the contact information (step S12), at the time of the lock driving, the CPU 11 verifies whether or not the input coincides with the input pattern already registered by the user in the DRAM 14. If, as a result, the input coincides with the registered input pattern, the input is determined to be that from the owner of the portable information terminal unit 1. So, processing transfers to a step S13 to unlock the loading.

That is, by the portable information terminal unit 1 carrying out the above-described, first processing sequence, the loading of the portable information terminal unit on the cradle 4 automatically locks the loading. In this manner, it is possible to prevent the portable information terminal unit 1 from becoming disengaged from the cradle 4 under trifling vibrations as the user's load is relieved. Moreover, security may be protected smoothly.

The pre-registered input pattern is not limited to a password of several digits but also may be a simple figure, such as ○ or Δ, or a specified curved pattern. Thus, it suffices for the user to draw only simple figures on the pressure-sensitive panel, without inputting a password of several digits, thus further relieving the user's load.

Figure 10:
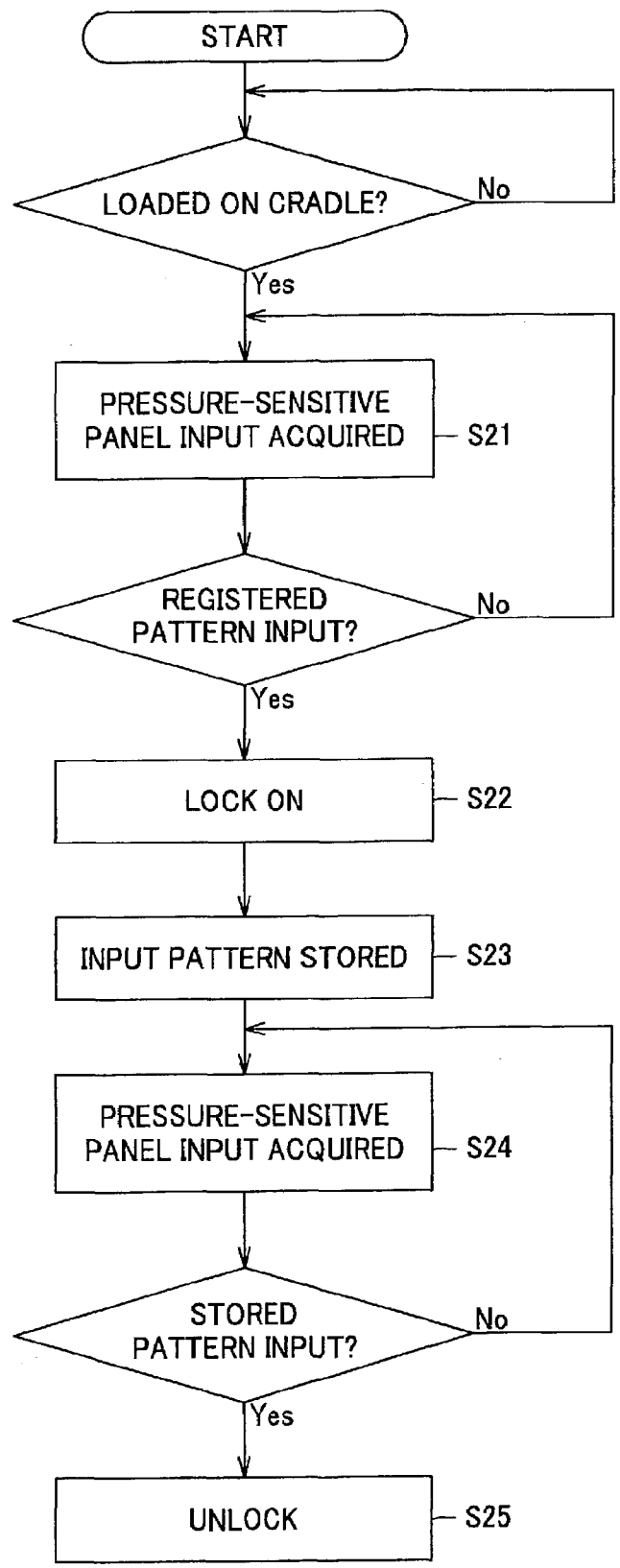
FIG. 10 is a flowchart showing a second processing sequence of a portable information terminal unit embodying the present invention.

Referring to FIG. 10, the second processing sequence of the portable information terminal unit 1 embodying the present invention is explained in detail.

When the portable information terminal unit 1 is loaded on the cradle 4, the cradle connecting unit 26 detects the loading of the portable information terminal unit on the cradle 4 and sends a loading detection signal to the CPU 11. When the user's input through the pressure-sensitive panel 163 is accepted (step S21), the CPU 11 checks whether or not the input coincides with the input pattern already registered by the user in the DRAM 14. If the input coincides with the registered input pattern, the input is determined to be the input from the owner of the portable information terminal unit 1, such that the CPU 11 controls the lock driving unit 27 to lock the loading on the cradle 4 (step S22). The CPU 11 causes the input pattern, input from the pressure-sensitive panel, to be stored in the DRAM 14 (step S23).

If, after loading the lock on the cradle 4, the user's input through the pressure-sensitive panel 163 is accepted (step S24), in step S23, the CPU 11 checks whether or not the input coincides with the input pattern stored in the DRAM 14. If the input in question coincides with the input pattern stored in the DRAM 14, it is determined that the input in question is that from the party who locked the loading of the portable information terminal unit 1 on the cradle 4. Thus, the CPU 11 transfers to a step S25 to unlock the loading.

That is, since the input pattern input in this second processing sequence at the time of locking the loading of the portable information terminal unit 1 on the cradle 4 is known only to the party who previously registered the input pattern on the DRAM 14, it is impossible for a third party to unlock the loading. Moreover, since the input pattern input at the time of locking is known only to the person who made the input, it is not possible for a third party to unlock the loading to carry away the portable information terminal unit.

In addition, the pre-registered input pattern or the input pattern input when the user locks the loading is not limited to a password of several digits, but also may be a simple figure such as ○ or Δ or a specified curved pattern. Thus, it suffices for the user to draw only a simple figure on a pressure-sensitive panel each time the loading is locked or unlocked, without the necessity of inputting a password of several digits, thus relieving the user's load as in the first processing sequence described above.

While the invention has been described in accordance with certain preferred embodiments thereof illustrated in the accompanying drawings and described in the description in detail, it should be understood by those ordinarily skilled in the art that the invention is not limited to the embodiments, but various modifications, alternative constructions or equivalents can be implemented without departing from the scope and spirit of the invention as set forth and defined in the appended claims.

What is claimed is:

1. A portable information apparatus, comprising:
   a portable information terminal unit having a display element for displaying information and a transparent pressure-sensitive panel arranged on the display element for performing input operations;
   a cradle for detachably mounting the portable information terminal unit thereto, in which, when the portable information terminal unit is loaded on said cradle, data can be transmitted or received between the portable information terminal unit and other electronic equipment through said cradle;
   a cradle connecting unit for detecting the loading of the terminal unit to the cradle and transmitting a loading detection signal;
   a lock driving unit for locking the portable information terminal unit to said cradle; and
   a control means for controlling the lock driving unit to lock the portable information terminal unit to the cradle in response to the loading detection signal transmitted by the cradle connecting unit, and for controlling the lock driving unit to unlock the portable information terminal unit from the cradle in response to a user's input of a pattern drawn on the pressure-sensitive panel that coincides with a registered pattern,
   wherein said control means requires a selected pattern to be drawn by a user on said pressure-sensitive panel when the portable information terminal unit is loaded on the cradle before the control means controls the lock driving unit to lock the portable information terminal unit to the cradle.

2. The portable information apparatus according to claim 1, wherein said portable information terminal unit comprises a DRAM in which said registered pattern is stored.

3. The portable information apparatus according to claim 1, wherein said portable information terminal unit comprises a DRAM in which said registered pattern is stored, and wherein said selected pattern is stored in said DRAM as said registered pattern that must be matched by a user's input through the pressure-sensitive panel before the lock driving unit is controlled by the control means to unlock the portable information terminal unit from the cradle.

4. The portable information apparatus according to claim 1, wherein said control means comprises a CPU arranged to receive the loading detection signal transmitted by the cradle connecting unit, to control the lock driving unit, and to verify whether or not a user's input coincides with the registered pattern.

5. The portable information apparatus according to claim 1, wherein said registered pattern comprises a simple figure or curved pattern drawn on the pressure-sensitive panel.

6. The portable information apparatus according to claim 1, wherein said registered pattern is a pattern which was previously drawn by a user on the pressure-sensitive panel when locking the portable information terminal unit to the cradle.

7. A lock controlling system, comprising:
   a portable information terminal unit having a display element for displaying information and a transparent pressure-sensitive panel arranged on the display element for performing input operations;
   a cradle connected to an electronic equipment, said cradle having a means for detachably mounting the portable information terminal unit thereto such that when the portable information terminal unit is loaded on said cradle, data can be transmitted or received between the portable information terminal unit and said electronic equipment through said cradle;
   a cradle connecting unit for detecting the loading of the terminal unit to the cradle and transmitting a loading detection signal;
   a lock driving unit for locking the portable information terminal unit to said cradle; and
   a control means for controlling the lock driving unit to lock the portable information terminal unit to the cradle in response to the loading detection signal transmitted by the cradle connecting unit, and for controlling the lock driving unit to unlock the portable information terminal unit from the cradle in response to a user's input of a pattern drawn on the pressure-sensitive panel that coincides with a registered pattern,
   wherein said control means requires a selected pattern to be drawn by a user on said pressure-sensitive panel while the portable information terminal unit is mounted in the cradle before the control means controls the lock driving unit to lock the portable information terminal unit to the cradle.

8. The lock controlling system according to claim 7, wherein said portable information terminal unit comprises a DRAM in which said registered pattern is stored.

9. The lock controlling system according to claim 7, wherein said portable information terminal unit comprises a DRAM in which said registered pattern is stored, and wherein said selected pattern is stored in said DRAM as said registered pattern that must be matched by a user's input through the pressure-sensitive panel before the lock driving unit is controlled by the control means to unlock the portable information terminal unit from the cradle.

10. The lock controlling system according to claim 7, wherein said control means comprises a CPU arranged to receive the loading detection signal transmitted by the cradle connecting unit, to control the lock driving unit, and to verify whether or not a user's input coincides with the registered pattern.

11. The lock controlling system according to claim 7, wherein said registered pattern coincides with a simple figure or curved pattern drawn on the pressure-sensitive panel.

12. The lock controlling system according to claim 7, wherein said registered pattern is a pattern which was previously drawn by a user on the pressure-sensitive panel when locking the portable information terminal unit to the cradle.

* * * * *